(12) United States Patent
Carey et al.

(10) Patent No.: US 10,597,837 B2
(45) Date of Patent: Mar. 24, 2020

(54) HYDRAULIC SYSTEM AND METHOD FOR WATER CONTROL

(71) Applicant: RiverRestoration.org, LLC, Carbondale, CO (US)

(72) Inventors: Jason Carey, Carbondale, CO (US); Stephen Michael Scurlock, Carbondale, CO (US)

(73) Assignee: RiverRestoration.org, LLC, Carbondale, CO (US)

( * ) Notice: Subject to any disclaimer, the term of this patent is extended or adjusted under 35 U.S.C. 154(b) by 0 days.

(21) Appl. No.: 15/482,382

(22) Filed: Apr. 7, 2017

(65) Prior Publication Data

US 2017/0298585 A1    Oct. 19, 2017

Related U.S. Application Data

(60) Provisional application No. 62/323,380, filed on Apr. 15, 2016.

(51) Int. Cl.
*E02B 3/02* (2006.01)
*E02B 8/08* (2006.01)
(Continued)

(52) U.S. Cl.
CPC .............. *E02B 1/006* (2013.01); *A01K 63/00* (2013.01); *A01K 79/02* (2013.01); *E02B 3/02* (2013.01);
(Continued)

(58) Field of Classification Search
CPC ... E02B 1/006; E02B 3/02; E02B 8/06; E02B 8/08; E02B 8/085; E02B 7/20–48
(Continued)

(56) References Cited

U.S. PATENT DOCUMENTS

| 1,290,867 A | * | 1/1919 | Arnold | ...................... E02B 9/08 |
| | | | | 405/76 |
| 1,726,522 A | * | 9/1929 | Ambursen | ................ E02B 7/42 |
| | | | | 405/101 |

(Continued)

FOREIGN PATENT DOCUMENTS

| GB | 1340865 A | * | 12/1973 | ................ E02B 7/42 |
| JP | 58076604 A | * | 5/1983 | ................ E02B 9/02 |

OTHER PUBLICATIONS

Office Action in related Canadian Patent Application No. 2,964,117, dated May 4, 2018.
(Continued)

*Primary Examiner* — Frederick L Lagman
*Assistant Examiner* — Stacy N Lawson
(74) *Attorney, Agent, or Firm* — Polsinelli PC

(57) ABSTRACT

Aspects of the present disclosure involve hydraulic systems and methods for altering a flow of a body of water, such as a river, channel, and/or other flowing or uncontained bodies of water. In one aspect, a hydraulic system provides a velocity barrier for the impedance of aquatic organism migration. More particularly, the velocity barrier may be adapted based on the swimming capabilities of one or more aquatic organisms to impede migration. The aquatic organism may be one or more species of fish, such as species sea lamprey (*Petromyzon marinus*). The example implementations shown and described herein reference the restriction of the sea lamprey. However, it will be appreciated that other aquatic organisms could be restricted by the presently disclosed technology, for example, with different hydraulic targets depending on swimming capabilities.

19 Claims, 8 Drawing Sheets

(51) Int. Cl.
*E02B 7/20* (2006.01)
*E02B 1/00* (2006.01)
*A01K 63/00* (2017.01)
*A01K 79/02* (2006.01)
*E02B 7/40* (2006.01)
*A63B 69/00* (2006.01)
*A63B 69/12* (2006.01)

(52) U.S. Cl.
CPC ......... *A63B 69/0093* (2013.01); *A63B 69/125* (2013.01); *A63B 2225/60* (2013.01); *A63B 2225/605* (2013.01); *E02B 7/40* (2013.01); *E02B 8/08* (2013.01); *Y02A 40/60* (2018.01)

(58) Field of Classification Search
USPC .................................. 405/81, 83, 87, 91–106
See application file for complete search history.

(56) References Cited

U.S. PATENT DOCUMENTS

| | | | | | |
|---|---|---|---|---|---|
| 2,026,656 | A | * | 1/1936 | Schon | E02B 7/40 405/101 |
| 4,040,257 | A | * | 8/1977 | Andrews | E02B 9/08 405/77 |
| 4,332,506 | A | * | 6/1982 | Andrews | E02B 9/08 405/101 |
| 4,549,837 | A | * | 10/1985 | Hebert | E02B 7/205 405/100 |
| 4,780,024 | A | * | 10/1988 | Obermeyer | E02B 7/005 405/115 |
| 5,032,038 | A | | 7/1991 | Lemperiere | |
| 5,178,490 | A | * | 1/1993 | Snowberger | E02B 7/44 405/100 |
| 5,984,575 | A | * | 11/1999 | Knott, Sr. | E02B 7/42 405/100 |
| 2003/0072617 | A1 | * | 4/2003 | Burns, II | E02B 1/003 405/81 |
| 2004/0009041 | A1 | * | 1/2004 | Aughton | E02B 7/26 405/99 |
| 2005/0129463 | A1 | * | 6/2005 | Craig | E02B 8/085 405/99 |
| 2014/0251478 | A1 | * | 9/2014 | Dolezilek | G05D 7/0641 137/861 |

OTHER PUBLICATIONS

Response to Office Action in related Canadian Patent Application No. 2,964,117, filed Nov. 5, 2018.

* cited by examiner

HYDRAULIC SYSTEM AND METHOD FOR WATER CONTROL

CROSS-REFERENCE TO RELATED APPLICATIONS

The present application claims benefit of priority under 35 U.S.C. § 119 to U.S. Provisional Patent Application No. 62/323,380, entitled "HYDRAULIC SYSTEMS AND METHODS" and filed Apr. 15, 2016, which is incorporated by reference in its entirety herein.

TECHNICAL FIELD

Aspects of the present disclosure relate to systems and methods for flow control of a body of water, such as a river or channel. More specifically, aspects of the present disclosure provide for creating a velocity barrier within a body of water to prevent upstream migration of one or more species of fish and/or to provide watersurfaces for recreational purposes.

BACKGROUND

Rivers, channels, streams, and other flowing bodies of water are often a vital component of cities and towns. However, such tributaries may provide passageways for invasive aquatic species to migrate to ecosystems in which the aquatic species do not natural occur. For example, the sea lamprey (*Petromyzon marinus*) is an invasive, parasitic fish to the Great Lakes Fishery that has been culpable of mass detriment to populations of native species such as lake trout (*Salvelinus namaycush*), steelhead (*Oncorhynchus mykiss*), whitefish (*Coregonus clupeiformis*), and chub (*Coesius plumbeus*). The decline in native species population due to the migration of the sea lamprey from the Great Lakes upstream into other regions has resulted in a negative economic impact on those regions. Efforts implemented to prevent sea lampreys from accessing upstream regions have included the construction of instream, physical barriers which operate to block passage while allowing for jumping fish species mobility to perform spawning activities. However, these barriers are often designed such that native fish species cannot travel upstream or may not be adequate to prevent the movement of the sea lamprey upstream. For example, many barriers include structures on which the sea lamprey may attach to work their way past the barrier. Other barriers may include pockets within the flow of water through the barrier that the sea lamprey may exploit to bypass the barrier. To prevent the migration of one or more of these parasitic or other types of aquatic wildlife, better controlled and more consistent barriers are needed.

It is with these issues in mind, among others, that various aspects of the present disclosure were developed.

SUMMARY

One implementation of the present disclosure may take the form of a barrier system for prevention of migration of an aquatic species. The barrier system may include one or more adjustable barrier sills comprising an approach surface extending at least partially perpendicular to a direction of water flow in a body of water, the approach surface vertically contracting a volume of water flow in the body of water, the body of water comprising an upstream portion and a downstream portion. The barrier system may also include plurality of flow guide structures adjacent to at least one of the one or more adjustable barrier sills to horizontally contract the volume of water flow in the body of water, each of the plurality of flow guide structures comprising an elongated wall with a downstream end and an upstream nose end, the upstream nose end extending away from the adjacent at least one of the one or more adjustable barrier sills to funnel the water flow over the at least one of the one or more adjustable barrier sills.

Another implementation of the present disclosure may take the form of a method for controlling a flow of velocity of a body of water. The method may include the operations of receiving, at a control system, flow or velocity information of the body of water from a plurality of sensors, calculating a target flow velocity of a volume of water through a flow velocity barrier within the body of water based on the received information, the flow velocity barrier comprising a plurality of adjustable barrier sills and a plurality of flow guide structures adjacent to at least one of the plurality of adjustable barrier sills, and transmitting one or more control signals to control at least one of the plurality of adjustable barrier sills of the flow velocity barrier in response to the calculated target flow velocity of a volume of water through a flow velocity barrier, the one or more control signals to configure the at least one of the plurality of adjustable barrier sills to allow a flow of water of the body of water over the at least one of the plurality of adjustable barrier sills, wherein a velocity of the flow of water over the at least one of the plurality of adjustable barrier sills equals or exceeds the target flow velocity of the volume of water through the flow velocity barrier.

DETAILED DESCRIPTION

Aspects of the present disclosure involve hydraulic systems and methods for altering a flow of a body of water, such as a river, channel, and/or other flowing or uncontained bodies of water. In one aspect, a hydraulic system provides a velocity barrier for the impedance of aquatic organism migration. More particularly, the velocity barrier may be adapted based on the swimming capabilities of one or more aquatic organisms to impede migration. The aquatic organism may be one or more species of fish, such as species sea lamprey (*Petromyzon marinus*). The example implementations shown and described herein reference the restriction of the sea lamprey. However, it will be appreciated that other aquatic organisms could be restricted by the presently disclosed technology, for example, with different hydraulic targets depending on swimming capabilities.

In one aspect, the velocity barrier is operated by a hydraulic structure in a channel that is composed of a sill and one or more flow guide structures. The sill may include: an approach to create vertical or horizontal flow uniformity approaching the sill; a crest to generate a head differential and to pass flood flows; a rundown to maximize the velocities generated by the head differential; and a stilling basin to return the velocities to environmental averages. The flow guide structures are adapted to create uniform flow velocities at the sill due to the lateral contraction of the channel. The flow guide structures may each include a flow guide wall adapted to force a swim path in high velocity flow and a flow guide nose adapted based on specific hydraulics of contraction to limit the velocity separation in three dimensions from the flow guide wall. The flow guide structures thus reduce flow separation at a hydraulic boundary downstream of a contraction.

In some implementations, the velocity barrier may include one or more gates affixed to one or more of the sills to make the hydraulic system adjustable. An adjustable sill may be actuated by structure adjustment of the sill or by hydraulic adjustment resulting from adjustment of one or more sills in the barrier system. Further, the hydraulic structure may include a boat passage channel having a flow regulation gate and a jumping or velocity barrier and/or a fish passageway having a flow regulation gate and a jumping or velocity barrier.

In one implementation, the velocity barrier may be deployed in a hydraulic system having a supercritical flow redirect structure for generating watersurfaces to hydroplane small water craft for recreational purposes, including human enjoyment and sport, on an uncontained body of water.

Figure 1:
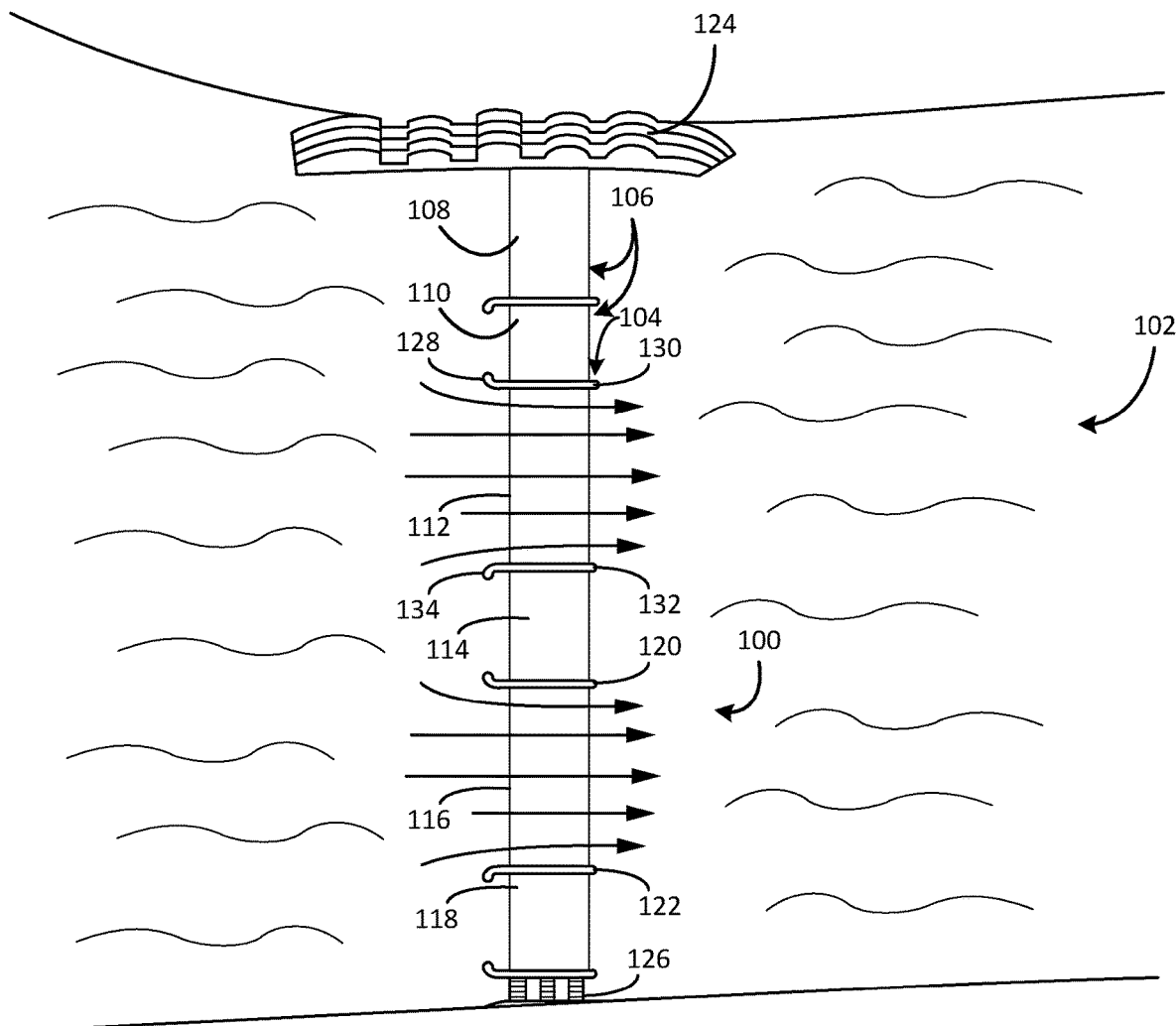
FIG. 1 is a diagram of an overhead view of a velocity barrier system for prevention of upstream migration for one or more aquatic species.

FIG. 1 is a diagram of an overhead view of a velocity barrier system 100 for prevention of upstream migration for one or more aquatic species. As shown, the velocity barrier system 100 is located within the body of water 102 and spans the body from one shore to the other. In other words, the velocity barrier system 100, in some embodiments, extends across the entire width of the body of water 102. The velocity barrier system 100 is described herein as being located within a river 102. However, it should be appreciated that the system 100 may be included in any body of water 102 in which water flows in an upstream to downstream direction. As such, the description of the velocity barrier 100 in a river 102 should not be construed as limiting the barrier to that particular body of water.

In general, the velocity barrier system 100 operates to contract the flow of water through the barrier in either or both a vertical direction (or river depth) and a horizontal direction (or river width). By contracting the volume of the flowing water, the velocity of the flow of water is increased as the water passes through the barrier system 100. In some embodiments, the increase in the velocity of the water acts to prevent the migration of certain aquatic species from swimming against the current through the barrier 100. Further, through the use of the various components of the system 100, the flow velocity may be tuned such that some aquatic species are prevented from swimming upstream while allowing other species to pass through the barrier. Further still, the velocity barrier system 100 may be configured such that the flow of water through the barrier is consistent or even across the flow barrier to avoid pockets of low-velocity flow that aquatic species may use to bypass the barrier. In this manner, the velocity barrier system 100 creates a barrier against the migration of certain aquatic species while allowing for the natural flow of water downstream.

Initially, the velocity barrier system 100 includes a series of sill barriers 106 and a series of flow guide structures 104 disposed between the sill barriers. For example, the velocity barrier system 100 illustrated in FIGS. 1 and 2 include six sill barriers 106 of varying widths. In the particular embodiment illustrated, a first sill barrier 108 (located on the far right of the system 100 of FIG. 2) has a first width, a second sill barrier 116 (second to the right of the system) has a second width, a third sill barrier 114 (third to the right of the system) has a third width, and so on. However, the sill barriers 106 of the system 100 may be any width as desired and/or dependent on the overall width of the river 102. Further, the sill barriers 106 may be the same width as another sill barrier of the system, or different. Further still, the system 100 may include any number of sill barriers 106. The number of sill barriers 106 included in the system 100 may be dependent on many factors, including the desired granularity of the adjustment of the flow velocity through the barrier to account for various aquatic species and the overall width of the river 102.

Figure 2:
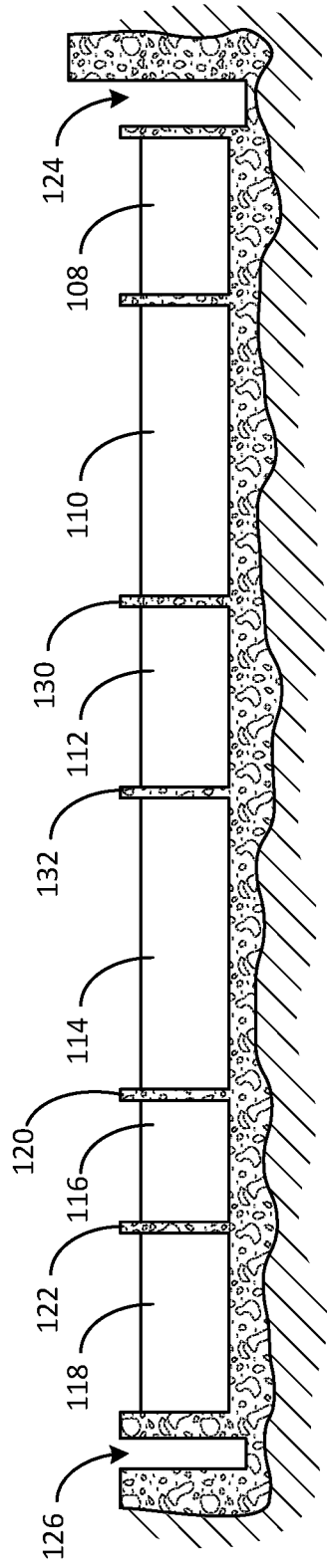
FIG. 2 is a diagram of front view of a velocity barrier system for prevention of upstream migration for one or more aquatic species.

Disposed between each of the sill barriers 106 of the system 100 may be a flow guide structure 104. In general, the flow guide structure 104 provides barriers between the sill barriers 106 such that water is prevented from flowing from one sill barrier 106 to an adjacent sill barrier. In one particular embodiment, the flow guide structure 104 includes a wall or pier made of concrete or other sturdy material. The flow guide structures 104 create channels or flow paths through the barrier system 100 that allow for water to flow. For example and as show in FIG. 1, water may flow over sill barrier 116 between flow guide structure 120 and flow guide structure 122. Similar the sill barriers 106, the barrier system 100 may include any number of flow guide structures 104. To allow the water to flow, the flow guide structures 104 may extend above the waterline of the river 102, as shown in FIG. 2. In some embodiments, the flow guide structures 104 may extend above a measured or average high waterline 202 for the river based on a measured or average yearly fluctuation in the waterline.

In one embodiment of the velocity barrier 100, the flow guide structures 104 may be oriented within the body of water 102 with an upstream end 128 and a downstream end 130. Both the upstream end 128 and the downstream end 130 of the flow guide structures 104 may be rounded to facilitate a uniform flow of water around the ends. Further, the upstream end 128 of the flow guide structures 104 may extend toward the side of the river 102 to provide a smooth flow into and over a barrier sill 108. The upstream end 128, or "nose", of the flow guide structures 104 may further operate in conjunction with the nose end of other flow guide structures to provide the smooth flow into a barrier sill. For example, barrier sill 112 of the velocity barrier system 100 may be adjacent to a first flow guide structure 104 and a second flow guide structure 132. To funnel water into the barrier sill 112, a nose end 128 of flow guide structure 104 may extend toward a righthand shore of the river 102. Similarly, a nose end 134 of flow structure 132 may extent toward a lefthand shore of the river 102. As water encounters the nose ends 128, 134 of the flow guide structures 104, 130, the water is directed into the barrier sill 112 to provide a smooth flow of water into the barrier sill. In this manner, the nose ends 128, 134 of the flow guide structures 104 may aid in the velocity control of water through the barrier.

The barrier system 100 may provide a smooth flow of water through the barrier sills 106 to aid in further preventing the migration of aquatic species through the barrier. In general, non-uniformity in the flow of water through the barrier may provide areas that the aquatic species may utilize to bypass the barrier. Therefore, a smooth or uniform flow of water through the barrier 100 may provide further prevention of species migration. As such, the nose ends 128 of the flow guide structures 104 aid in providing this uniform flow of water through the barrier sills 106. In another embodiment, a chamfer surface or other symmetrical sloping surface may be incorporated between the flow guide structures 104 and the adjacent barrier sills 106. These chamfer surfaces may further provide a uniform flow of water through the barrier sills 106, especially when the barrier sill is in the open position.

Figure 3:
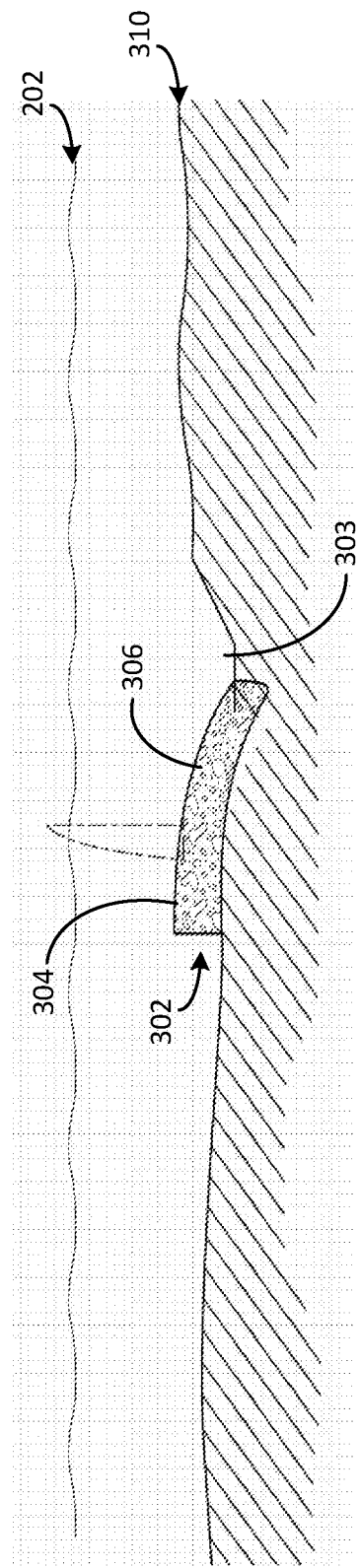
FIG. 3 is a cross-section diagram of a gate structure included in a velocity barrier system for prevention of upstream migration for one or more aquatic species.

FIG. 3 illustrates a cross-section diagram of an embodiment of the sill barrier structure 106 included in the velocity barrier system 100 for prevention of upstream migration for one or more aquatic species. The embodiment illustrated is but one possible cross-section shape of the sill barrier structure 106 of the barrier system 100. Further, in one particular embodiment of the barrier system 100, one or more of the sill barriers 106 may be adjustable from an open position (allowing water to flow over through the flow channel created by the adjacent flow guide structures 104 and over the sill barrier) and a closed or upright position (preventing water from flowing through the flow channel and over the sill barrier). The diagram of the sill barrier 106 of FIG. 3 illustrates the barrier in the open position in solid lines and in the upright position in the dotted lines. As explained in more detail below with reference to FIGS. 6A-6B, the barrier is adjustable between the open and upright position through a mechanical, electrical, or hydraulic system of the barrier sill structure 106.

As shown in FIG. 3, the barrier sill structure 106 is generally located along or partially within the riverbed 310 or existing grade of the river or side channels. Further, the barrier sill structure 106 is typically disposed within the riverbed 310 to allow water to flow over the structure when in the open position. The barrier sill structure 106 includes an approach surface 302, a crest surface 304, a runoff or ramp surface 306 and a stilling basin 303. These components operate to create a uniform flow of water with an increased velocity over the barrier, returning the water flow to a normal flow after flowing over the barrier sill structure 106. In FIG. 3, water of the river 102 flows from the left-hand side of the figure (or upriver) to the right-hand side of the figure (or downriver). As such, the water of the river 102 passes over the barrier sill structure 106 located within the riverbed 310 of the river.

Water flowing downriver encounters the approach surface 302 of the barrier sill 106. The approach surface 302 is generally a flat surface that creates a substantially perpendicular surface from the riverbed 310 to a crest surface 304 of the barrier sill 106. Water flowing over the barrier sill 106 is thereby vertically contracted as it passes over the crest 304 of the barrier. By vertically contracting the volume of water as it flows over the barrier sill 106, the velocity of the flow of water is increased. As also explained in more detail below, the volume of water is similarly horizontally contracted through the flow guide structures 104 to further increase the water flow velocity. Further downriver from the crest 304, the barrier sill 106 includes a sloping runoff surface 306 that slopes from the crest to generally below the existing riverbed 310. This sloping runoff surface 306 further increases the flow velocity of the water over the barrier sill 106. Continuing downriver, the barrier sill 106 includes a stilling basin 303. The stilling basin 303 includes a hole with a depth that lies below the general depth of the riverbed 310. An upriver portion of the stilling basin 303 is formed by a bottom portion of the runoff surface 306 of the barrier sill 106. In one embodiment, a downriver portion of the stilling basin 303 is formed by an upward slope in the riverbed 310 extending from the lower depth of the basin to the natural depth of the riverbed 310. In another embodiment, the downriver portion of the stilling basin 303 is constructed as a single piece with the barrier sill 106 such that the entirety of the stilling basing 303 is constructed from the same material as the barrier sill 106. Regardless of the embodiment used, the stilling basin 303 operates to collect the water flowing over the barrier sill 106 and return the flow velocity to a natural flow of the river. In this manner, the flow velocity of the river 102 may be increased as the water flows over the barrier sill 106, but may remain at a natural flow velocity in other portions of the river 102.

As mentioned, some embodiments of the barrier sill 106 allow for the sill to be adjustable between an open position and an upright position. When water is allowed to flow over the barrier sill 106 (with an increased velocity), the barrier sill is considered to be in the open configuration. In an upright configuration (shown in FIG. 3 with the dotted lines), the barrier sill 106 operates to prevent water from flowing over the sill. As should be appreciated, however, water may pass over the barrier sill 106 even in the upright configuration when the water level of the river 102 extends the vertical extension of the upright barrier, such as in flooding or other high water level events. In general, however, the barrier sill 106 is designed to prevent water from flowing over the sill in a typical annual waterline fluctuation in the upright position.

During adjustment from open configuration to upright configuration, the runoff surface 306 of the barrier sill 106 moves from a generally horizontal position to a generally vertical position, extending from the riverbed 310 past the waterline of the river 102. As such, the barrier sill 106 may include a hinged mechanism that allows the barrier sill 106 to pivot about the hinge from the open to the upright position and back. Various mechanisms to adjust the barrier sill 106 between the two positions are discussed in more detail below with relation to FIGS. 6A and 6B. Through the adjustment of the one or more barrier sills 106 of the velocity barrier system 100, a desired velocity of a flow of water over the open barrier sills may be achieved to prevent the migration of one or more aquatic species past the barrier.

Figure 4:
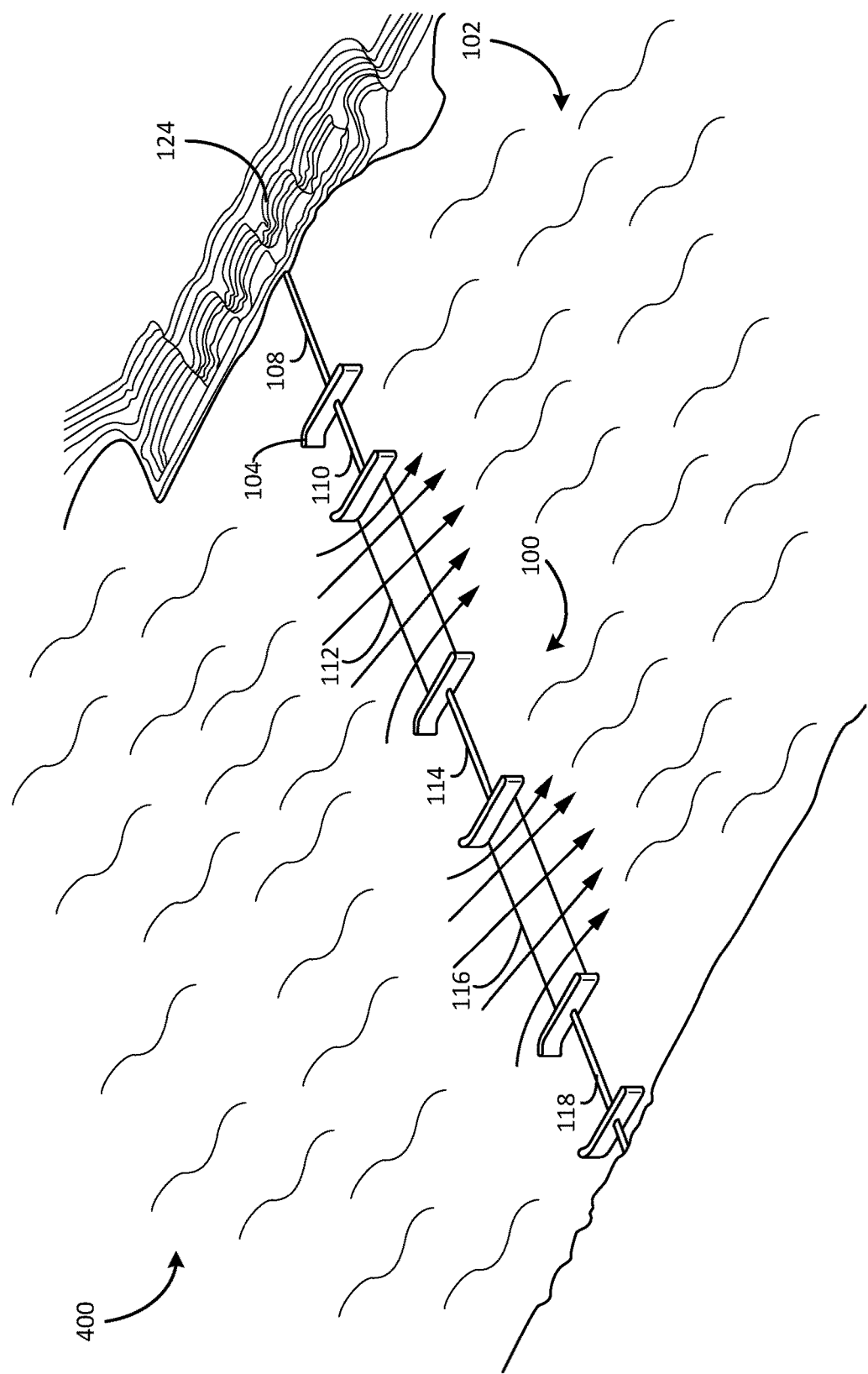
FIG. 4 is a diagram illustrating a first configuration of a velocity barrier system for prevention of upstream migration for one or more aquatic species.

For example, FIG. 4 is a diagram illustrating a first configuration 400 of a velocity barrier system 100 for prevention of upstream migration for one or more aquatic species. The velocity barrier system 100 of FIG. 4 is the same system illustrated in FIGS. 1 and 2 and discussed above. Thus, the barrier system 100 of FIG. 4 includes six sill barriers 106 of varying widths, namely barrier sill 108, barrier sill 110, barrier sill 112, barrier sill 114, barrier sill 116, and barrier sill 118. Disposed between each barrier sill 106 of the system 100 is a flow guide structure 104 to guide water over one or more of the barrier sills 106. The barrier sills 106 of the velocity barrier system 100 may each include the same cross-sectional shape as that shown in FIG. 3 and discussed above, such that each sill barrier includes an approach surface 302, a crest 304, a runoff surface 306 and a stilling basing 303. In general, however, the sill barriers 106 may be of any shape and size to accommodate an increase in flow velocity over the sill barrier as water from the river 102 flows through the barrier system 100. Further, one or more of the sill barriers 106 may be adjustable between an open position that allows water to flow over the sill barrier and an upright position that prevents water from flowing over the sill barrier under normal waterline conditions.

Through control of the adjustable sill barriers 106, the water flow velocity over one or more of the sill barriers may be controlled. In the example illustrated in FIG. 4, barrier sill 108, barrier sill 110, barrier sill 114, and barrier sill 118 are in the upright configuration such that water does not flow over the barrier sills. Rather, water is forced to flow over barrier sill 112 and barrier sill 116, which are in the open or down position. Through the configuration of the various barrier sills 106 of the barrier system 100, the available paths through which water can flow through the barrier system 100 are controlled. Further, because the configuration of the barrier sills 106 as shown in FIG. 4 effectively horizontally contract the width of river, the flow of water through the open barrier sills 112, 116 increases in velocity. In addition and as described above, the open barrier sills 112, 116 also include a vertical or depth contraction to further increase the velocity of the water flowing through the barrier system 100. To further increase the flow velocity, one of the open barrier sills 112, 116 may be adjusted to the upright position to prevent water from flowing over the newly upright barrier.

Figure 5:
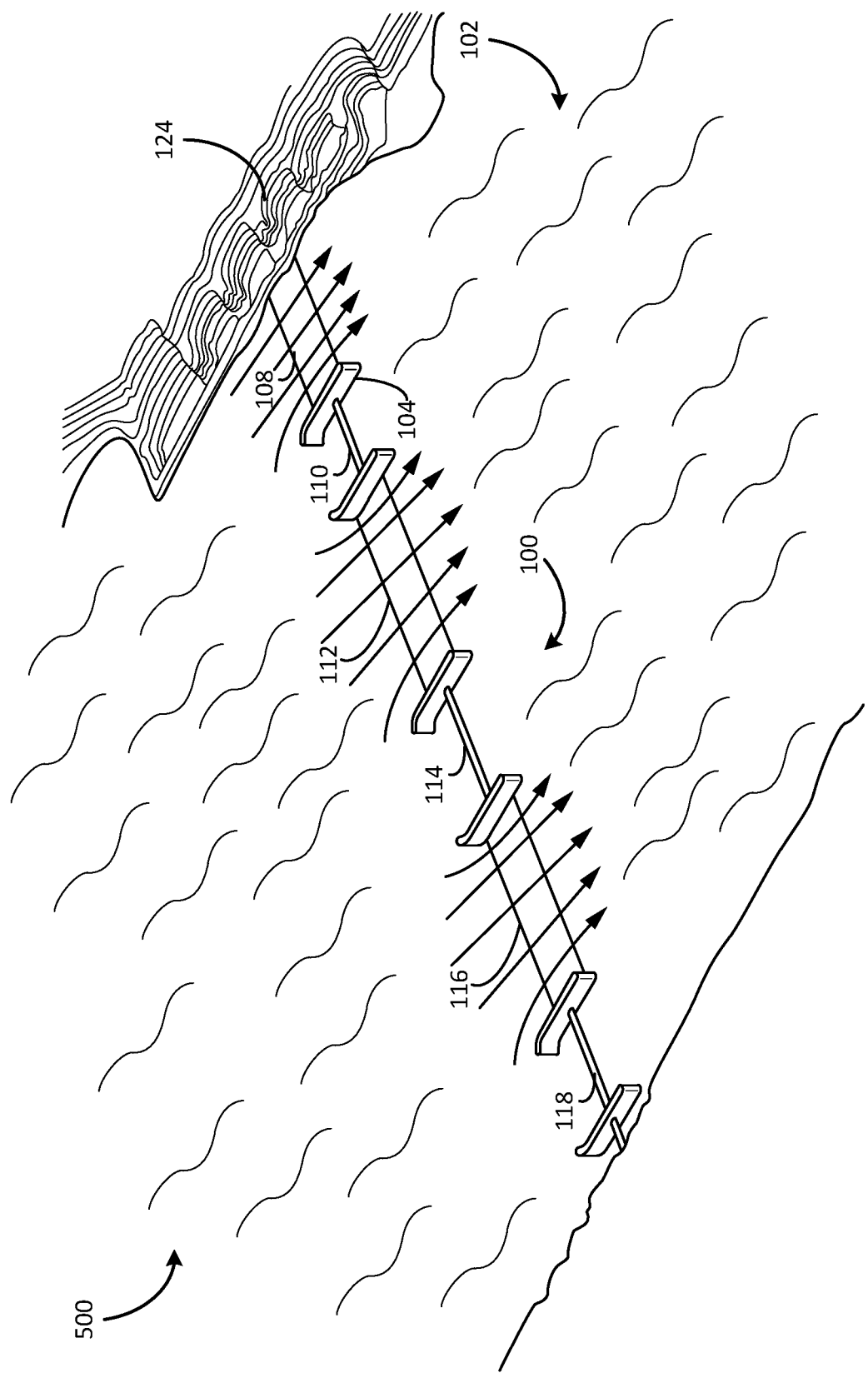
FIG. 5 is a diagram illustrating a second configuration of a velocity barrier system for prevention of upstream migration for one or more aquatic species.

In yet another example, operation of the barrier system 100 may decrease the water velocity. FIG. 5 is a diagram illustrating a second configuration 500 of a velocity barrier system 100 for prevention of upstream migration for one or more aquatic species. In general, the velocity barrier 100 illustrated in FIG. 5 is the same as that described above with relation to FIG. 4 and includes barrier sill 108, barrier sill 110, barrier sill 112, barrier sill 114, barrier sill 116, and barrier sill 118, with a flow guide structure 104 disposed between each barrier sill. However, in this configuration 500, barrier sill 108 is in the open position such that water from the river 102 may flow over the barrier sill. Thus, the difference between the embodiment 400 shown in FIG. 4 and the embodiment 500 shown in FIG. 5 is that the barrier sill 108 is in the upright position in embodiment 400 and in the open position in embodiment 500. This illustrates the adjustable nature of the barrier sills 106 of the barrier system 100 to alter the flow velocity of the water through the system. In particular, by allowing water to flow through barrier sill 108, the velocity flow of water through the open barrier sills 108, 112, 116 of the barrier system 100 may be reduced. Alternatively, by adjusting more barrier sills 106 into the upright position, the velocity flow of water through any open barrier sills may be increased. In this manner, an operation of the barrier system 100 may control or tune the velocity of water flow through the barrier system as desired, such as to prevent certain aquatic species from upriver migration.

An operator of the barrier system 100 may adjust the flow velocity for any reason and may incorporate many types of configurations of the barrier sills 106 of the system. For example, it may be determined that a particular aquatic species can be prevented from upriver migration through a free overfall configuration. In this particular configuration of the system 100, each of the barrier sills 106 are placed in the upright position such that water flows over the upright sills, creating a waterfall on the downriver side of the barrier sill. This may prevent aquatic species that cannot travel up a waterfall from migrating upriver. This configuration may also be selected when it is desired to create a higher waterline upriver from the barrier system 100. As such, upriver flooding or downriver water levels may be considered when deciding the proper configuration for the barrier system 100. In one particular embodiment, readings from one or more waterline sensors, water velocity flow sensors, and water usage meters (both located upriver and/or downriver from the barrier system 100) may be obtained and utilized to determine the barrier system configuration.

In another example, upriver waterline sensors or water velocity flow sensors may detect a potential flooding situation. To prevent upriver flooding, each of the barrier sills 106 of the barrier system 100 may be adjusted to an open position to allow water to flow through the barrier with as little obstruction as possible. This may be done, in one circumstance, if the water velocity is high enough from the flooding condition to prevent upriver migration or, in another circumstance, to prevent the upriver flooding regardless of upriver migration of aquatic species. In this manner, public safety may be weighed against the prevention of upriver species migration when determining the proper barrier system 100 configuration for the river conditions.

Between the full upright configuration and the full open configuration, the barrier system 100 may be adjusted to any number of other configurations, as explained above. For example, a subset of the barrier sills 106 of the barrier system 100 may be in the open position, while others may be in the upright position (such as that described above with relation to FIG. 4). Further, the desired flow velocity through the open barrier sills may be controlled by the number of barrier sills that are upright versus open. In general, flow through some adjustable barrier sills may be controlled through adjustment of other barrier sill within the barrier system. For example, placing one or more of the barrier sills 106 in an upright position may increase flow through the barrier sills that are in the open position. An upriver flow velocity of the river 102 may also be considered when determining the number of barrier sills to place in the open position and in the upright position. Thus, to achieve or exceed a threshold water velocity through any open barrier sill 106 of the system 100 to prevent migration of a particular aquatic species, information of a current velocity flow may be obtained and the barrier sills of the system may be adjusted accordingly.

In yet another embodiment, one or more of the barrier sills 106 of the barrier system 100 are placed in a partially upright position. In other words, it is not required that the barrier sills 106 be in a fully upright or fully open position. Rather, the barrier sills 106 may be adjusted to be adjusted to any position between fully upright and fully open. For example, the barrier sills 106 may be adjusted to a partially upright position that allows water to overfall the barrier sill, with the waterfall being less than a similar situation with the barrier sill in the fully upright position. In another example, one or more of the barrier sills 106 may be in a partially upright position (thereby allowing some overflow) with other barrier sills are in the fully open position. This may be selected as the barrier system 100 configuration when upriver flooding is a concern such that water is allowed to flow over the barrier when the waterline of the river 102 reaches a particular height, while still providing some water velocity control through the open barrier sills 106.

Figure 6:
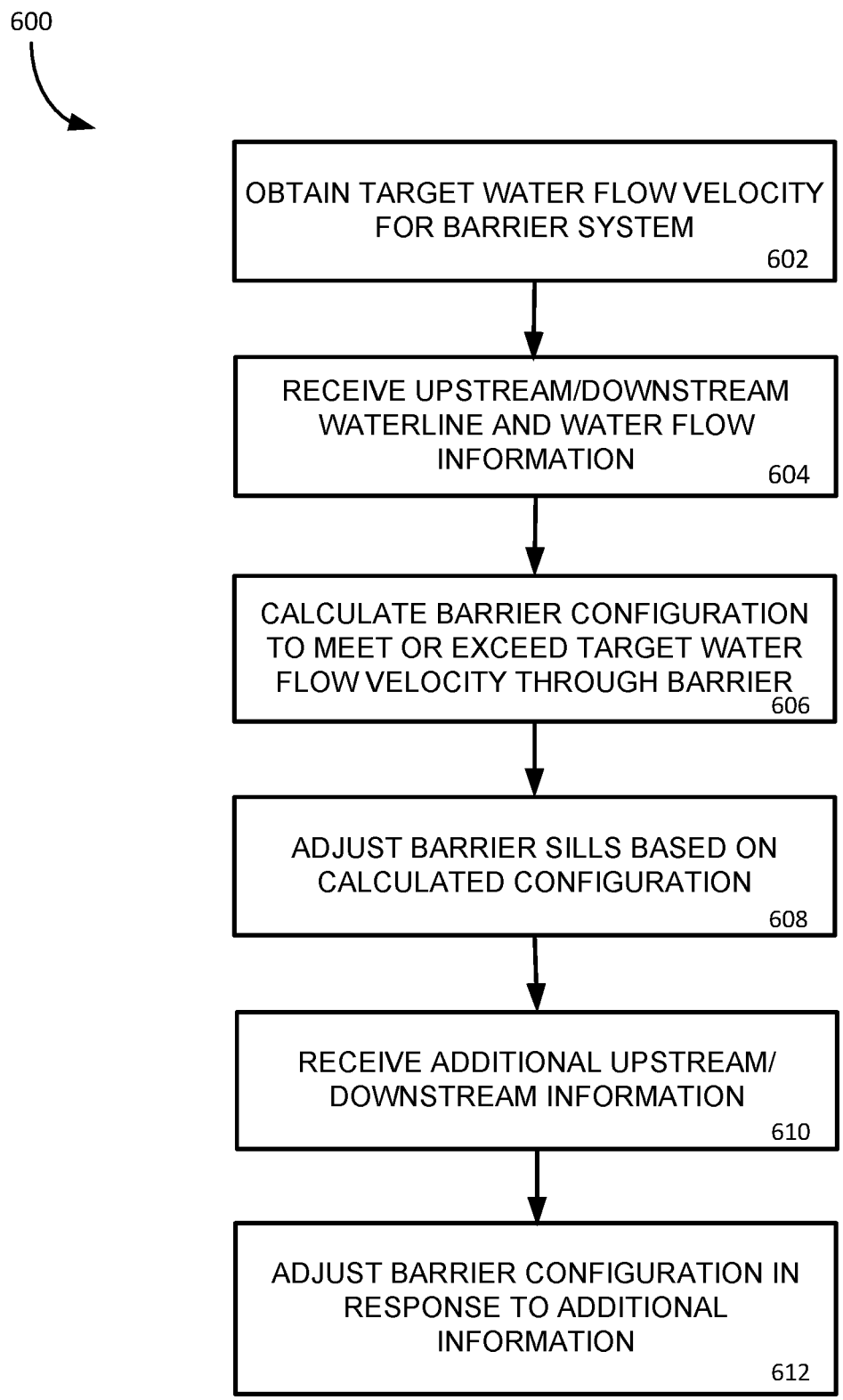
FIG. 6 is a flowchart of a method for controlling a velocity barrier system for prevention of upstream migration for one or more aquatic species.

Through control of the barrier sills 106 of the barrier system 100, the velocity of the flow of water through the barrier system may be tuned or selected in response to environmental or predetermined information. FIG. 6 is a flowchart of one particular method 600 for controlling a velocity barrier system 100 for prevention of upstream migration for one or more aquatic species. In general, the operations of the method 600 of FIG. 6 may be performed or executed by a control device or control system in communication with the barrier system 100. More particularly, the control system may adjust one or more of the barrier sills 106 of the barrier system 100 in response to obtained or received information to achieve a target flow velocity through the barrier system.

Beginning in operation 602, the control system obtains or receives a target water flow velocity for the barrier system 100. In some instances, the target water flow velocity is a velocity that prevents upstream migration of a particular aquatic species. This target water flow velocity may be input to the control system by an operator, or may be obtained from one or more databases of water velocities. In operation 604, the control system may also receive upriver and/or downriver information, such as water line height, potential flood readings, and water flow velocity from locations upriver from the barrier system and downriver from the barrier system. This information may be provided to the control system through a control system user, or may be provided from one or more sensors located along the river 102. In general, this information provides the control system with a current condition of the river 102, both upstream and downstream of the barrier system 100. It should be appreciated that other sensors and other information may be obtained and provided to the control system for use by the control system of the barrier 100.

In operation 606, the control system calculates a barrier configuration that meets or exceeds the target water flow velocity based at least on the current measured river conditions. As explained above, the adaptability of the barrier sills 106 of the barrier system 100 allow for various water flow velocities through the barrier system 100. In particular, the barrier sills 106 of the system 100 may be adjusted to an open position or an upright position (or between the open position and the upright position). Through some combination of open and upright barrier sills 106, an estimated velocity flow through the barrier may be obtained. The control system, therefore, may utilize the current river conditions to determine a particular configuration of the barrier system 100 that meets or exceeds the target velocity flow through the barrier. In operation 608, the control system adjusts one or more of the barrier sills 106 of the barrier system 100 in accordance with the calculated barrier configuration to achieve or exceed the target velocity flow through the barrier.

In operation 610, the control system may receive additional information from the operator, the barrier system 100, and/or the river sensors discussed above. This information provides information on changes to the river environment, including increases or decreases in the waterline of the river, increases or decreases in flow velocity of the river, and potential flooding situations of the river. With this information, the control system may further adjust one or more of the barrier sills 106 of the barrier system 100 in operation 612. For example, if the additional or post-configuration information indicates a potential flooding situation upriver, the control system may adjust one or more of the barrier sills 106 into an open position to allow more of the river water to flow through the barrier 100. The target flow velocity may be maintained in such circumstances as an upriver flow velocity may also increase with the potential for flooding.

Figure 7A:
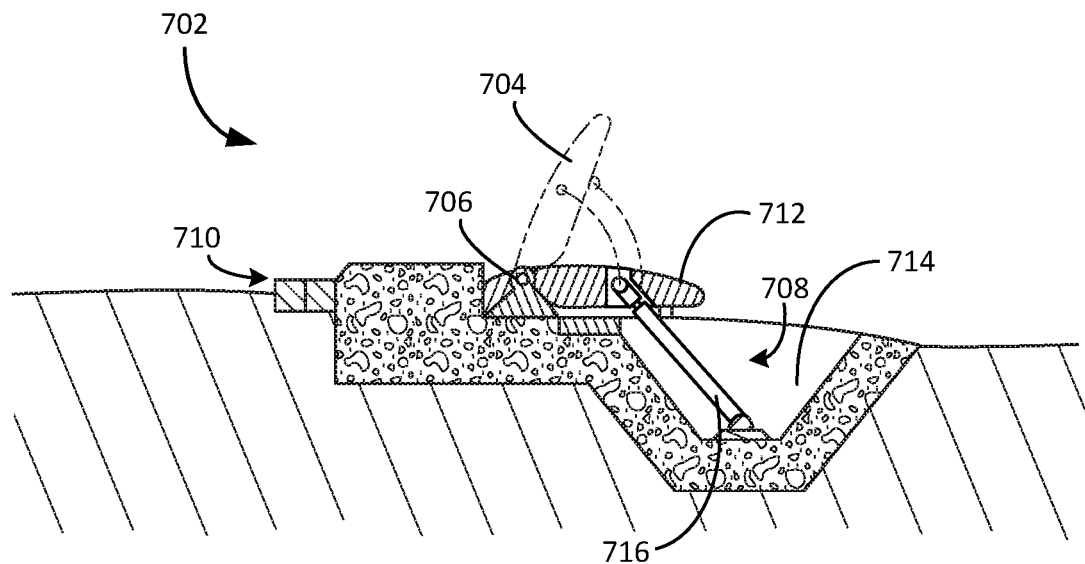
FIG. 7A is a cross-section diagram of a first adjustable gate structure for a velocity barrier system for prevention of upstream migration for one or more aquatic species.

To adjust the hydraulics or configuration of the barrier system 100, one or more of the barrier sills 106 may include an adjustable mechanism to adjust the barrier sill between an upright position and an open position. FIG. 7A illustrates a cross-section diagram of a first adjustable barrier sill structure 702 for a velocity barrier system 100 for prevention of upstream migration for one or more aquatic species. The adjustable barrier sill 702 is but one embodiment of a barrier sill that may be included with the velocity barrier system 100. In some embodiments of the velocity barrier 100, each of the barrier sills 106 of the system 100 include the adjustable barrier sill 702 shown in FIG. 7A. In other embodiments, fewer than all of the barrier sills 106 may be adjustable through the barrier sill embodiment shown in FIG. 7A.

As discussed above, the barrier sill 702 may include an approach surface 710, a runoff surface 712 and a stilling basin 714. In some adjustable barrier sills 702, all or a portion of the runoff surface 712 may be adjustable between an open or down position and an upright position. To facilitate the adjustable nature of the barrier sill 702, an adjusting mechanism 708 may be incorporated into the barrier sill. In the embodiment illustrated in FIG. 7A, the adjusting mechanism 708 includes a hydraulic piston 716 coupled to the downstream portion of the runoff surface 712 and the bottom of the stilling basin 714. When activated, the hydraulic piston 716 exerts an upward force on the runoff surface 712 or gate 704 to rotate the gate in a counterclockwise rotation about a hinged mechanism 706. The rotation of the gate 704 about the hinge 706 orients the gate into a partially vertical position to adjust the gate into an upright position. As should be appreciated, the hydraulic piston 716 may adjust the gate 704 into any position between fully open (or horizontal) to fully upright.

As the hydraulic piston 716 is coupled to the gate 704, the gate may be rotated in a clockwise rotation about the hinge 706 to return the gate to the open position. In some embodiments, the adjustment mechanism 708 may utilize the pressure applied to the runoff surface 712 to aid in returning the gate 704 to the open position. In other words, the pressure from the water striking the runoff surface 712 may push the gate towards the open position when the force from the hydraulic piston 716 is removed. Through the operation of the hydraulic piston 716, the gate 712 may therefore be adjusted between an open position and an upright position, as determined by a control system of the velocity barrier system 100. Thus, the control system discussed above may provide the one or more control signals to the hydraulic piston 716 to adjust the position of the adjustable barrier sill 702.

Figure 7B:
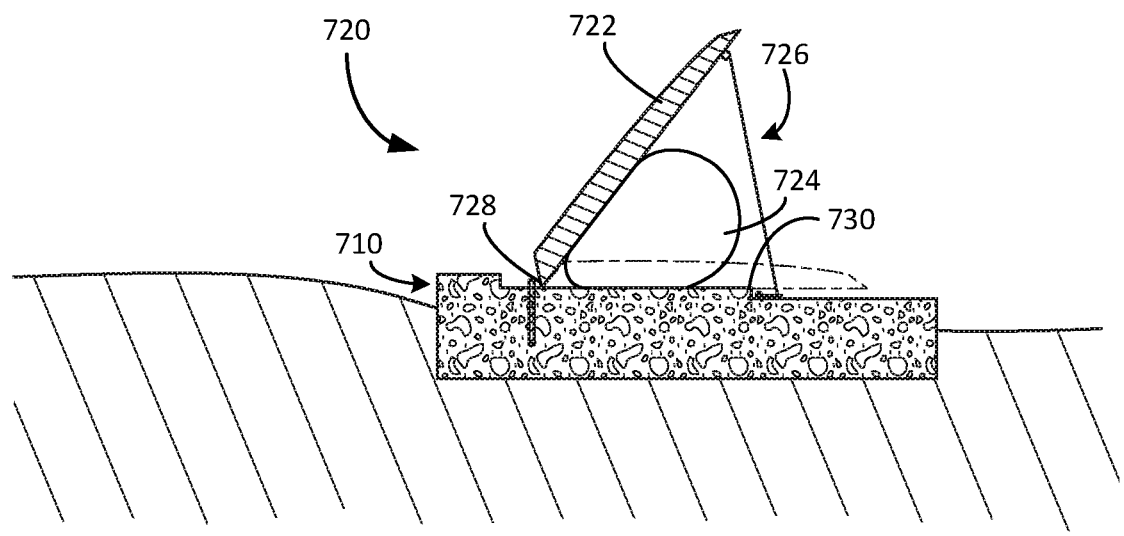
FIG. 7B is a cross-section diagram of a second adjustable gate structure for a velocity barrier system for prevention of upstream migration for one or more aquatic species.

FIG. 7B is a cross-section diagram of a second adjustable barrier sill structure 720 for a velocity barrier system 100 for prevention of upstream migration for one or more aquatic species. Similar to the embodiment of the barrier sill discussed above, the barrier sill structure 720 of FIG. 7B includes an adjusting mechanism 726 to adjust a position of a gate 722 between an open or down position and an upright position. In particular, the embodiment 720 of the barrier sill includes a pneumatic air system located beneath the gate 722. A rubber (or other material) bladder 724 is in sealed communication with the air system 726 such that the pneumatic air system may inject air into the bladder 724. The bladder is located between the gate 722 and a bottom surface 730 of the barrier sill such that, when the bladder is inflated by the pneumatic air system 726, the bladder exerts an upward force on the bottom side of the gate 722. Similar to above, the gate is hinged 728 and rotates counterclockwise when the upward force from the bladder 724 is applied. The more air that is injected into the bladder, the more the gate 722 rotates about the hinge, until the gate reaches a fully upright position (which may be completely or partially vertical). Thus, through the injection of air into the bladder 724, the gate 722 may be moved into the upright position. Control of the amount of air injected into the bladder 724 may place the gate 722 in a more or less upright position.

To return the gate 722 to a fully open position, the pneumatic air system 726 may remove air from the bladder 724, thereby deflating the bladder. The gate 722 thus rotates about the hinge 728 clockwise as the bladder deflates until the gate reaches the open position. Through the operation of the pneumatic air system 726, the gate 722 may therefore be adjusted between an open position and an upright position, as determined by a control system of the velocity barrier system 100. Thus, the control system discussed above may provide the one or more control signals to the pneumatic air system 726 to adjust the position of the adjustable barrier sill 720.

Returning to FIG. 1 and FIG. 2, some embodiments of the velocity barrier system 100 may include additional features integrated into or adjacent to the barrier system. For example, the velocity barrier system 100 may include a fish passage section 124, such as a fish ladder adjacent to a barrier sill, such as barrier sill 108. In general, the fish ladder 124 provides a path for a particular type of fish to bypass the barrier system 100, while preventing other types of fish from migrating through the fish ladder. Similarly, the velocity barrier system 100 may include one or more boat passage systems 126 that allow the passage of water craft through the velocity barrier. Similar to the fish ladder 124, the boat passage 126 may also be configured to prevent migration of a particular aquatic species through the boat passage, such as through a series of locks that allow the passage of watercraft, but not the aquatic species.

Figure 8:
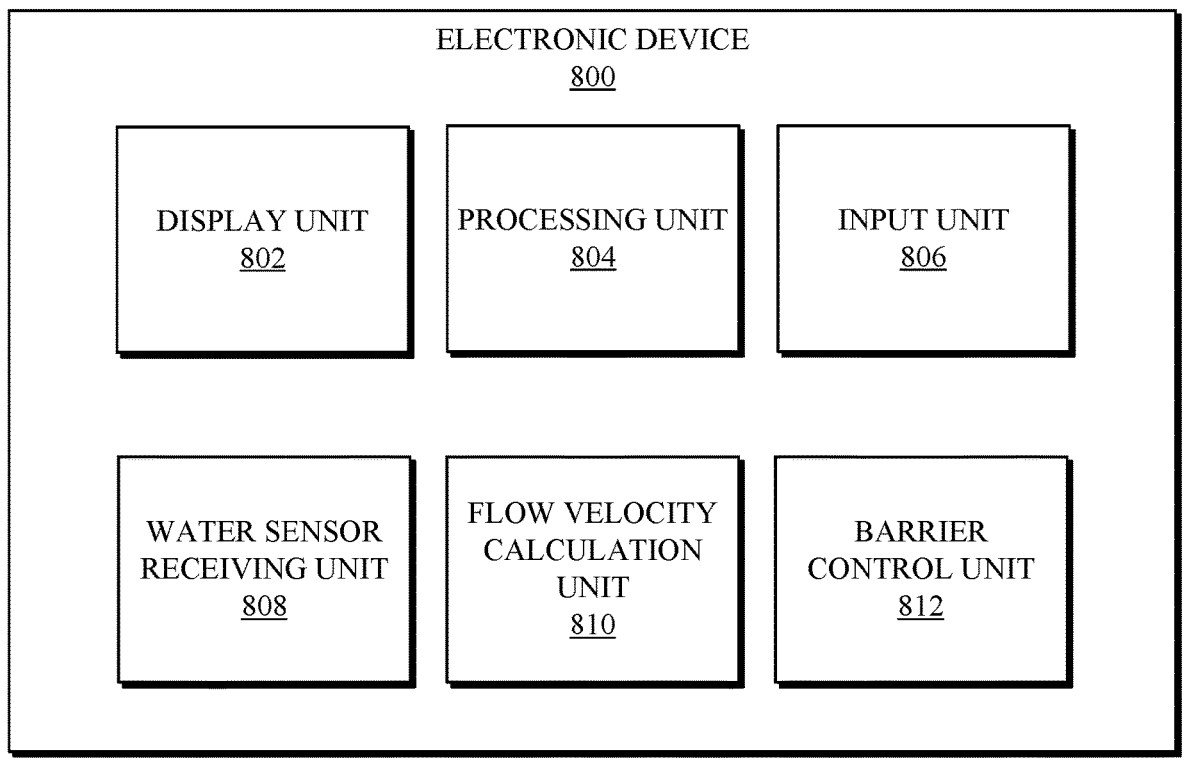
FIG. 8 is a functional block diagram of an example electronic device including operational units arranged to perform various operations of the presently disclosed technology.

Turning to FIG. 8, an example electronic device 800 including operational units 802-812 arranged to perform various operations of the presently disclosed technology is shown, such as the control system for the velocity barrier system 100 described above. The operational units 802-812 of the device 800 are implemented by hardware or a combination of hardware and software to carry out the principles of the present disclosure. It will be understood by persons of skill in the art that the operational units 802-812 described in FIG. 8 may be combined or separated into sub-blocks to implement the principles of the present disclosure. Therefore, the description herein supports any possible combination or separation or further definition of the operational units 802-812.

In one implementation, the electronic device 800 includes a display unit 802 configured to display information, such as a graphical user interface, and a processing unit 804 in communication with the display unit 802 and an input unit 806 configured to receive data from one or more input devices or systems. Various operations described herein may be implemented by the processing unit 804 using data received by the input unit 806 to output information for display using the display unit 802.

Additionally, in one implementation, the electronic device 800 includes units implementing the operations described with respect to FIG. 6. For example, the electronic device 800 may include a sensor receiving unit 808 for receiving one or more sensor readings of other information of a body of water. Further, the electronic device 800 may include a flow velocity calculating unit 810 configured to determine a target flow velocity for the body of water through the velocity barrier 100 in response to the information received. In a similar manner, a barrier control unit 812 may be included that creates and transmits control signals to the velocity barrier system 100 to configure the velocity barrier to reach or exceed the target flow velocity. For example, the barrier control unit 812 may provide a signal to one or more of the barrier sills 106 of the barrier system 100 to adjust the barrier sill between an open position and an upright position.

Figure 9:
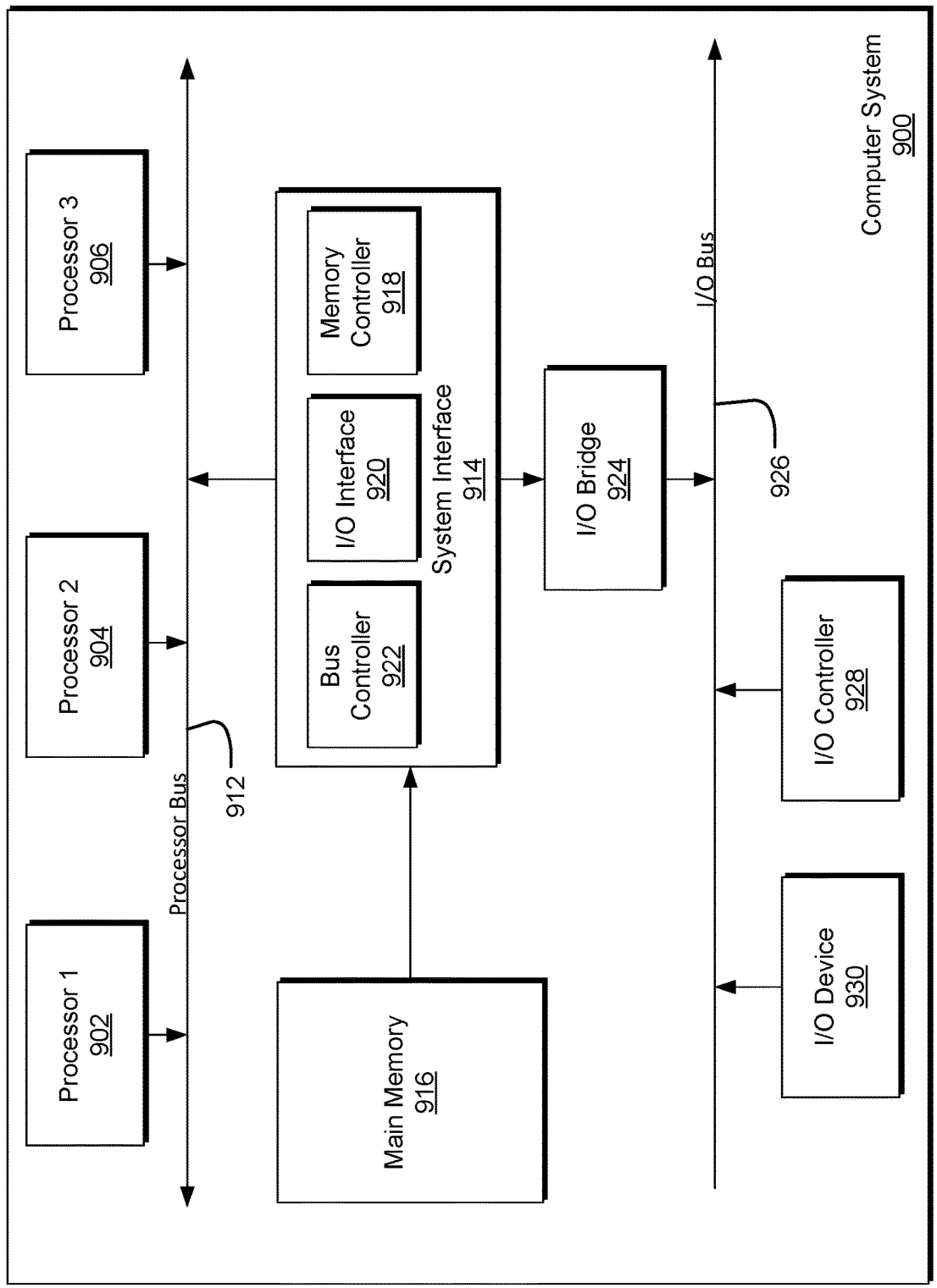
FIG. 9 is a diagram illustrating an example of a computing system which may be used in implementing embodiments of the present disclosure.

FIG. 9 is a block diagram illustrating an example of a computing device or computer system 900 which may be used in implementing the embodiments of the systems disclosed above. In particular, the computing device of FIG. 9 is one embodiment of the control system that performs one of more of the operations described above to control the flow velocity through the barrier system 100. The computer system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 914 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 940, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 916. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Described above are implementations of systems and methods for a velocity barrier system. While multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A barrier system for prevention of migration of an aquatic species, the system comprising:
   a flow velocity barrier extending from a first side to a second side across a body of water, the body of water comprising an upstream portion upstream from the flow velocity barrier and a downstream portion downstream from the flow velocity barrier;
   one or more adjustable barrier sills of the flow velocity barrier, the one or more adjustable barrier sills comprising an approach surface extending at least partially perpendicular to a direction of water flow in the body of water, the approach surface vertically contracting a volume of water flow in the body of water;
   a plurality of flow guide structures of the flow velocity barrier, the plurality of flow guide structures each disposed adjacent to a respective adjustable barrier sill of the one or more adjustable barrier sills, each of the plurality of flow guide structures comprising an elongated wall extending at least partially along the direction of water flow between a downstream end and an upstream nose end, the plurality of flow guide structures horizontally containing the volume of water flow in the body of water and directing the volume of water flow in the body of water over the one or more adjustable barrier sills of the flow velocity barrier, the flow velocity barrier generating a velocity of flow in the body of water; and
   a control system controlling the flow velocity barrier based on a target velocity, the target velocity determined based on a swimming capability of at least one aquatic species, the control system adjusting the velocity of flow in the body of water based on the target velocity using the flow velocity barrier until a migration of the at least one aquatic species is prevented.

2. The barrier system of claim 1 wherein the one or more adjustable barrier sills further comprise a sloping runoff component connected to the approach surface to further generate the velocity of flow in the body of water as the volume of water flows from the upstream portion to the downstream portion.

3. The barrier system of claim 2 wherein the one or more adjustable barrier sills further comprise a stilling basin connected to the sloping runoff component to receive the volume of water flow and return the target velocity of the body of water to a natural flow velocity.

4. The barrier system of claim 2 wherein the control system moves the one or more adjustable barrier sills between an open position and an upright position.

5. The barrier system of claim 4 wherein the one or more adjustable barrier sills further vertically contracts the volume of water flow in the body of water in the upright position.

6. The barrier system of claim 4 wherein the one or more adjustable barrier sills further comprises a hydraulic piston assembly in communication with a lower surface of the sloping runoff component and moving the one or more adjustable barrier sills to the upright position comprises activating the hydraulic piston assembly to rotate the sloping runoff component around a hinge.

7. The barrier system of claim 4 wherein the one or more adjustable barrier sills further comprises a pneumatic air system in communication with a lower surface of the sloping runoff component and moving the one or more adjustable barrier sills to the upright position comprises activating the pneumatic air system to rotate the sloping runoff component around a hinge.

8. The barrier system of claim 1 further comprising one or more flow velocity sensors in fluid communication with the upstream portion and the downstream portion of the body of water, the one or more flow velocity sensors providing flow velocity information of the body of water to the control system.

9. A method for controlling a body of water, the method comprising:
   obtaining a target flow velocity of a volume of water flow through a flow velocity barrier within the body of water, the target flow velocity determined based at least on a swimming capability of at least one aquatic species, the flow velocity barrier comprising a plurality of adjustable barrier sills and a plurality of flow guide structures adjacent to the plurality of adjustable barrier sills;

moving at least one of the plurality of adjustable barrier sills of the flow velocity barrier based on the target flow velocity; and preventing a migration of the aquatic species in the body of water by generating a velocity of a flow of water over the at least one of the plurality of adjustable barrier sills using the flow velocity barrier, the velocity of the flow of water being equal to or exceeding the target flow velocity.

10. The method of claim 9 wherein the target flow velocity is further determined based on flow velocity information captured using a plurality of flow velocity sensors, the plurality of flow velocity sensors comprising an upstream flow sensor and a downstream flow sensor, the flow velocity information comprising an estimated upstream flow velocity and an estimated downstream flow velocity.

11. The method of claim 10 further comprising:
receiving additional flow velocity information of the body of water from the plurality of flow velocity sensors, the additional flow velocity information indicating a change in the estimated upstream flow velocity or the estimated downstream flow velocity.

12. The method of claim 11 further comprising:
moving at least one of the plurality of adjustable barrier sills of the flow velocity barrier in response to the additional flow velocity information.

13. The method of claim 9 wherein the at least one of the plurality of adjustable barrier sills comprises an approach surface extending at least partially perpendicular to a direction of water flow in the body of water, the approach surface vertically contracting the volume of water flow in the body of water, the body of water comprising an upstream portion and a downstream portion.

14. The method of claim 13 wherein the at least one of the plurality of adjustable barrier sills further comprises a sloping runoff component connected to the approach surface to vertically expand the volume of water flow in the body of water as the volume of water flows from the upstream portion to the downstream portion.

15. The method of claim 14 wherein the at least one of the plurality of adjustable barrier sills further comprise a stilling basin connected to the sloping runoff component to receive the volume of water flow and return the velocity of the flow of water to a natural flow velocity.

16. The method of claim 14 wherein moving the at least one of the plurality of adjustable barrier sills includes a hydraulic piston assembly in communication with the at least one of the plurality of adjustable barrier sills rotating the sloping runoff component around a hinge.

17. The method of claim 14 wherein moving the at least one of the plurality of adjustable barrier sills includes a pneumatic air system in communication with the at least one of the plurality of adjustable barrier sills rotating the sloping runoff component around a hinge.

18. The method of claim 9 wherein each of the plurality of flow guide structures comprise an elongated wall with a downstream end and an upstream nose end, the upstream nose end extending away from the adjacent adjustable barrier sills to funnel the volume of water flow over the adjustable barrier sills.

19. The method of claim 9 wherein the target flow velocity is received at a control system, the control system comprising at least one processing device and a computer-readable medium connected to the processing device configured to store information and instructions that are executed by the processing device.

* * * * *